United States Patent [19]

Heindl et al.

[11] Patent Number: 4,781,571
[45] Date of Patent: Nov. 1, 1988

[54] INJECTION MOLDING MACHINE WITH APPARATUS FOR REMOVING INJECTION MOLDED ARTICLES

[75] Inventors: Friedrich Heindl, Baden, Austria; Wolf D. Hellmann, Beilngries, Fed. Rep. of Germany

[73] Assignee: Battenfeld Kunststoffmaschinen Ges.m.b.H., Kottingbrunn, Austria

[21] Appl. No.: 903,675

[22] Filed: Sep. 4, 1986

[30] Foreign Application Priority Data

Sep. 11, 1985 [DE] Fed. Rep. of Germany ....... 3532299

[51] Int. Cl.$^4$ ............................................. B29C 45/42
[52] U.S. Cl. .................................... 425/556; 425/444
[58] Field of Search .............. 425/441, 444, 351, 537, 425/554, 556

[56] References Cited

U.S. PATENT DOCUMENTS

| | | | |
|---|---|---|---|
| 3,028,629 | 4/1962 | Focht el al. ..................... | 425/556 X |
| 3,063,108 | 11/1962 | Gardner ......................... | 425/556 X |
| 3,081,486 | 3/1963 | Skvorc .......................... | 425/556 X |
| 3,669,592 | 6/1972 | Miller ........................... | 425/556 X |
| 4,124,352 | 11/1978 | Pasch ............................ | 425/444 X |
| 4,243,364 | 1/1981 | Rees et al. ..................... | 425/444 X |
| 4,449,914 | 5/1984 | Schmidts et al. ................ | 425/444 X |
| 4,514,166 | 4/1985 | Ichizawa et al. ................ | 425/537 X |
| 4,571,320 | 2/1986 | Walker .......................... | 425/444 X |

FOREIGN PATENT DOCUMENTS

| | | |
|---|---|---|
| 2450218 | 7/1975 | Fed. Rep. of Germany . |
| 2642691 | 3/1978 | Fed. Rep. of Germany . |
| 2352736 | 7/1980 | Fed. Rep. of Germany . |
| 3432262 | 5/1985 | Fed. Rep. of Germany . |
| 58-94442 | 6/1983 | Japan ................................... 425/554 |

OTHER PUBLICATIONS

Article from German magazine "PLASTverarbeiter" 1979, Nr. 8, pp. 453 through 457.
Article from German magazine "PLASTverarbeiter" 1985, Nr. 6, pp. 106 through 109.

*Primary Examiner*—Richard L. Chiesa
*Attorney, Agent, or Firm*—Toren, McGeady & Associates

[57] ABSTRACT

An injection molding machine (1) is equipped with an apparatus (7) for removing injection molded articles. The apparatus makes possible the removal of the articles (6) from the opened injection mold (3). A two-way support (10, 11, 12, 13) is moveably mounted on a guide bed (8) aligned parallel relative to the direction of actuation of the closing unit (2) for the injection mold (3). The two-way support has a vertically moveable carriage (13) with a support member (14) which at its lower end is provided with a gripping member (15) which is adjustable relative to the support member (14) about two longitudinal axes extending at a right angle relative to each other. The articles (6) can be removed from the opened injection mold (3) by means of the gripping member (15) and can be deposited as desired onto a device (16) either in front of the front end face or behind the rear face of the injection molding machine (1).

5 Claims, 4 Drawing Sheets

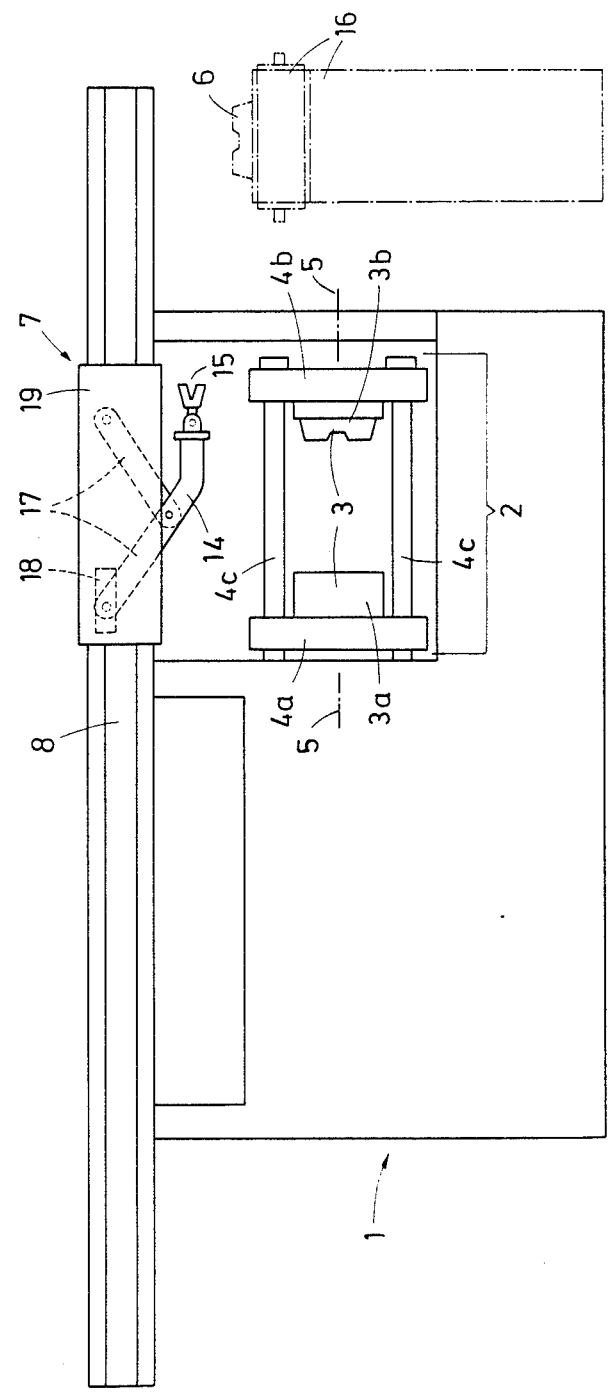

INJECTION MOLDING MACHINE WITH APPARATUS FOR REMOVING INJECTION MOLDED ARTICLES

BACKGROUND OF THE INVENTION

1. Field of the Invention

The invention relates to an injection molding machine with an apparatus for the linear removal of injection molded articles from the opened injection mold, wherein on a guide bed aligned above the closing unit for the injection mold is moveably mounted a two-way support or carriage with a support member carried by the two-way support or carriage. The support member carries at its lower end a grasping member for injection molded articles which grasping member is adjustable in an upward direction. The grasping member, in turn, is adjustable relative to the support member about at least two joints extending at a right angle relative to each other. The guide bed for the two-way support or carriage is aligned parallel relative to the direction of actuation of the closing unit and relative to the longitudinal axis of the injection molding machine.

2. Description of the Prior Art

An apparatus for removing injection molded articles of this type is described in the magazine "Plastverarbeiter" 1985, No. 6, pages 106 to 109.

These apparatus for removing injection molded articles use a two-way support which is moveable along the guide bed. This two-way support is technically very complicated and has a substantial structural weight. The carriage carrying the support member of the two-way support placed on the guide bed is constructed as a cantilever which is moveable in an upward and downward direction. The cantilever extends with a relatively great length above the closing unit parallel to the direction of actuation thereof and constitutes the guide for a third carriage which forms the actual support member.

It is apparent that, in injection molding machines equipped with these known apparatus for removing injection molded articles, difficulties will occur frequently because it is not only necessary to introduce the high structural weight of the apparatus into the injection molding machines, but also because a relatively large free space is required in order to be able to deposit the injection molded articles which have been grasped by the grasping member and have been transported out of the injection mold.

It is the object of the invention to provide for injection molding machines an apparatus for removing injection molded articles of the above-specified type, which is not only structurally less complicated, but can be realized with a reduced structural weight. In addition, it is an object to achieve an arrangement of the apparatus for removing injection molded articles relative to the injection molding machine which can be effected with minimum space for mounting the apparatus on the side next to the injection molding machine and, thus, facilitates an arrangement of adjacent injection molding machines relatively closely next to one another.

SUMMARY OF THE INVENTION

The object is met in accordance with the invention in that the two-way support or carriage supports or forms a carrier or cantilever on whose free end is arranged the support member so as to be vertically adjustable exclusively along a vertical plane extending through the longitudinal axis of the closing unit. The guide bed is fastened via support arms directly to or on the frame or housing of the injection molding machine. The guide bed projects at least with one of its ends over the end face of the injection molding machine or over the closing unit for the injection mold.

The features of the invention provide an apparatus for removing injection molded articles which operates as a linear removing apparatus, and is structurally simple and has a low structural weight. In addition, the apparatus insures in a simple manner that the injection molded articles removed from the injection mold can be deposited in front of the end face and/or behind the rear face of the injection molding machine where stacking and/or conveying devices can be arranged in an advantageous manner. Thus, adjacent injection molding machines can be placed relatively closely next to one another.

Since the apparatus for removing injection molded articles essentially operates only with linear movements, it can be operated by program control in an exact and problem-free manner. Since the movements can be freely programmed, very short distances of movement can be achieved.

On the other hand, it is possible to provide a guide bed which extends beyond the rear face of the injection molding machine, so that injection molded articles removed from the injection mold can be deposited by means of the apparatus also on the rear side of the injection molding machine.

Another structural further development of the apparatus according to the invention for removing injection molded articles is to be seen in that the carrier or cantilever is held on a vertical guide track of the carriage so as to be moveable exclusively in an upward and downward direction. The effective length of the support member relative to the carrier or cantilever may be adjustable. Of course, the apparatus for removing injection molded articles can also be constructed such that the support member is a straight-line guiding linkage formed as cardan or elliptic guide arms or as a pantograph, wherein the guide for sliding the linkage is aligned on the carriage or on the carrier or cantilever held by the carriage transversely of its own direction of movement.

The above features provide the advantage that, instead of a two-way support, only a simple carriage moveable along the guide bed is required, wherein the structural height of the carriage does not exceed or only slightly exceeds the structural height of the guide bed and wherein the carriage requires as support for the support member only a structurally light-weight cantilever which cantilevers to an extent which does not exceed the structural width of the closing unit.

Additional features and advantages of the subject matter of the invention shall be explained in the following with reference to the embodiments illustrated in the drawing.

BRIEF DESCRIPTION OF THE DRAWINGS

In the drawing:

FIG. 4 is a side view of an injection molding machine, as in FIG. 1, with a modified apparatus for removing injection molded articles.

DETAILED DESCRIPTION OF THE INVENTION

Figure 1:
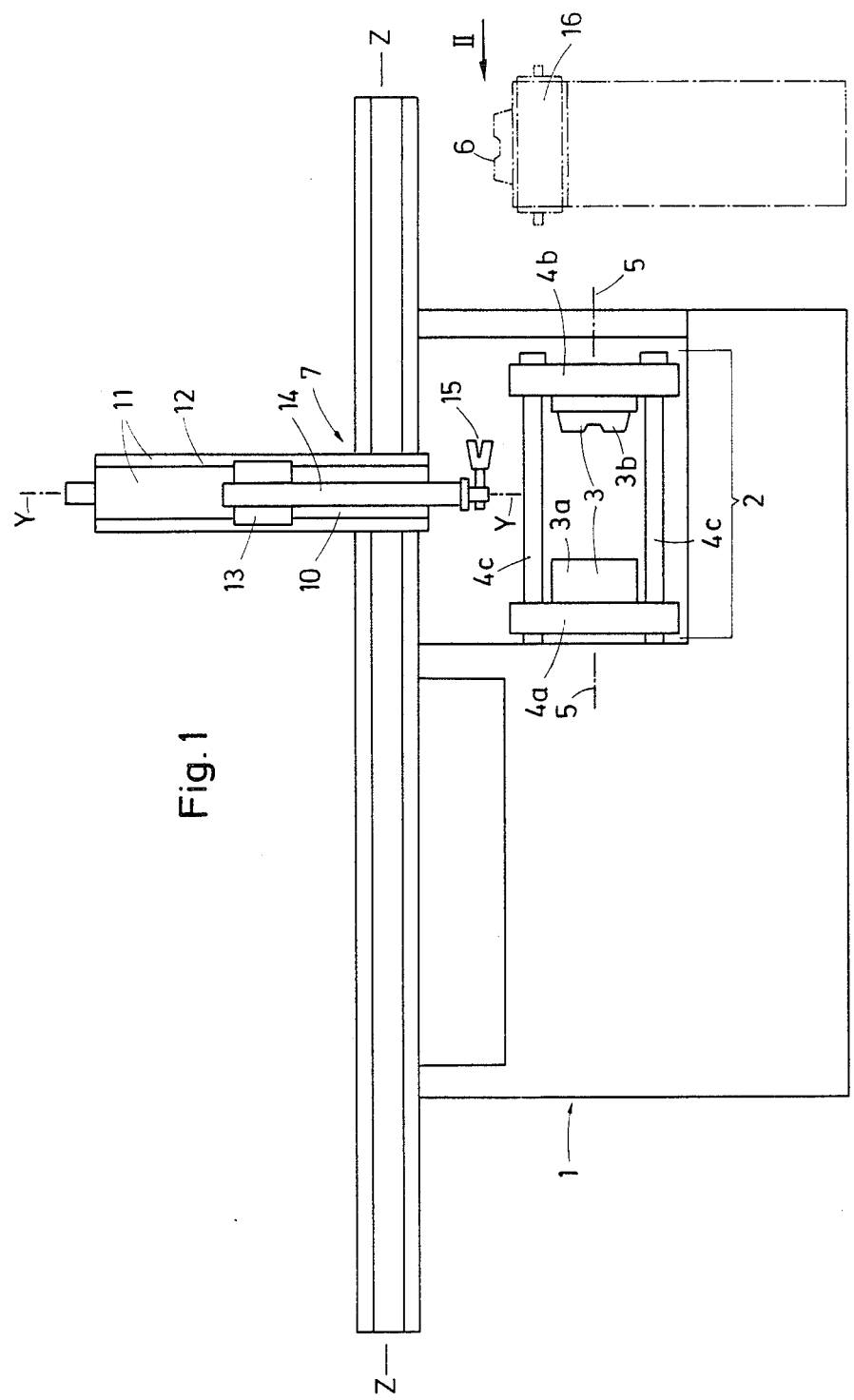
FIG. 1 is a schematically simplified side view of an injection molding machine with apparatus for removing injection molded articles, FIG. 2 a front view of the injection molding machine with apparatus for removing injection molded articles, seen in the direction of arrow II of FIG. 1.
Figure 3:
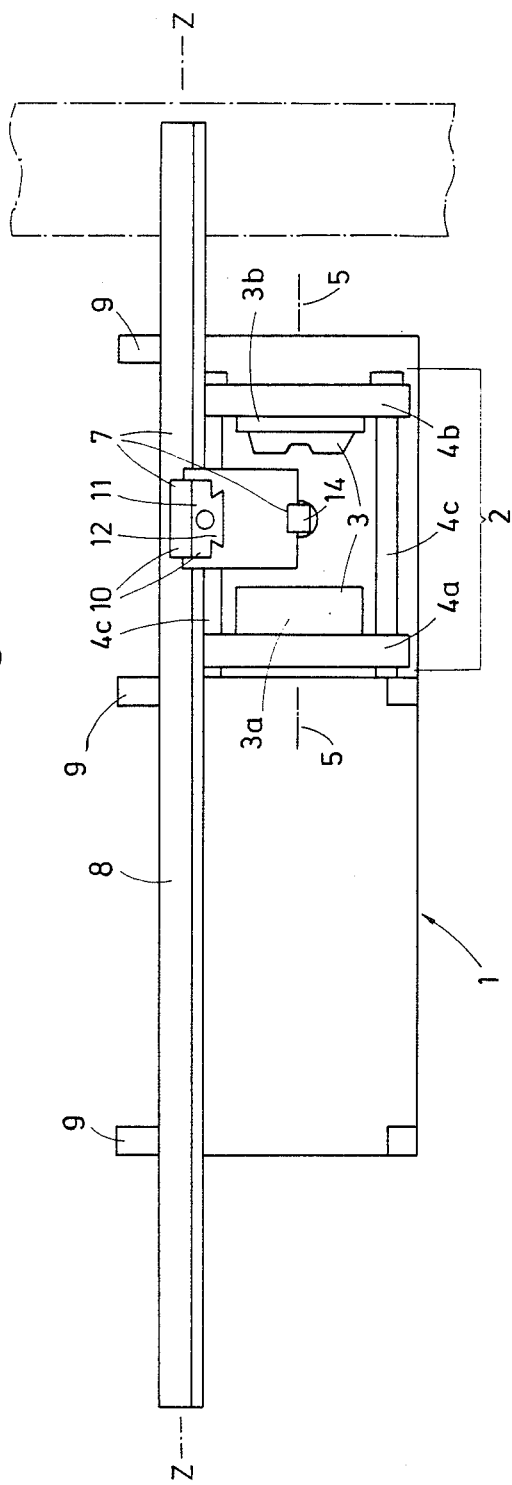
FIG. 3 is a top view of the arrangement illustrated in FIGS. 1 and 2.

The injection molding machine 1 illustrated in the drawing has at its one end a closing unit 2 for the injection mold 3 which is composed of two mold halves 3a and 3b. While mold half 3a is placed on a support plate 4a of closing unit which is horizontally moveable along guide rods 4c, the mold half 3b is fastened on a support plate 4b which is mounted stationary on guide rods 4c. Injection mold 3 can be opened and closed as desired by means of moveable support plate 4a within the closing unit 2 in the direction of longitudinal axis 5—5. In FIGS. 1 and 3 of the drawing, the injection mold 3 is illustrated in the opened state, i.e., with mold halves 3a and 3b being moved apart. An apparatus 7 for removing injection molded articles assigned to the injection molding machine 1 serves to remove the injection molded article 6 from injection mold 3.

Apparatus 7 for removing injection molded articles has a stationary guide bed 8 which extends parallel to the direction of actuation of the closing unit 2, i.e., parallel to the longitudinal axis 5—5 and, thus, also parallel to the longitudinal direction of the injection molding machine 1. Guide bed 8 is rigidly connected through several support arms 9 to the frame or housing of the injection molding machine 1.

Figure 2:
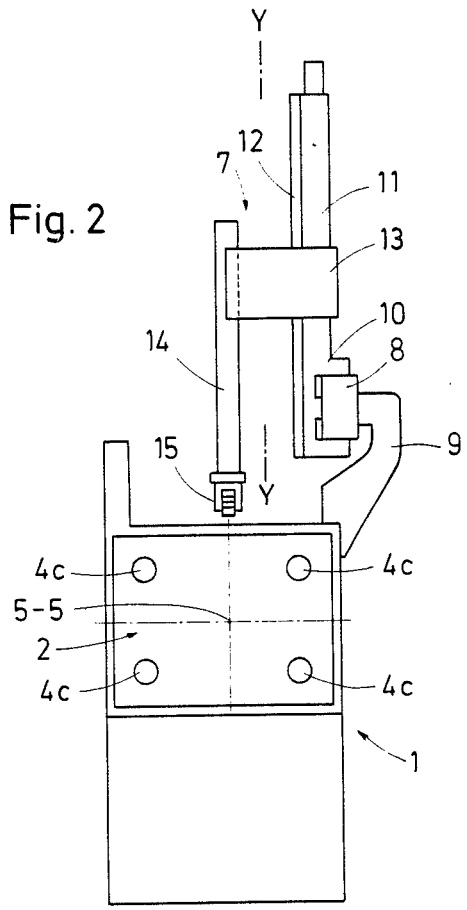

As illustrated in FIGS.1 to 3 of the drawing, guide bed 8 carries a main carriage 10 which is longitudinally moveable on guide bed 8. Main carriage 10 has a vertically upwardly directed member 11 provided with a guide track 12 on which, in turn, a carriage 13 is moveably arranged. Main carriage 10 and carriage 13 guided on upwardly directed member 11 together form a so called two-way support which has two axes of movement extending at a right angle relative to each other, i.e., the horizontally extending Z-axis and the vertically extending Y-axis.

Carriage 13 forms a carrier or cantilever on whose free end is arranged a support member 14 which carries at its lower end a gripping member which, on the one hand, is rotatable about its longitudinal axis and on, the other hand, is in connection with support member 14 by being pivotable about a transverse axis. Gripping member 15 is arranged on support member 14 in such a way that its longitudinal axis coincides with a vertical plane which extends through the longitudinally axis 5—5 of closing unit 2, as can be clearly seen in FIG. 2.

Support member 14 and gripping member 15 supported by support member 14 can be lowered in vertical direction between the guide rods 4c into the closing unit 2 when the latter is open, i.e., when the support plates 4a and 4b with the two mold halves 3a and 3b of the injection mold 3 are moved apart, as illustrated in FIGS. 1 and 3. The individual injection molded articles can then be removed in a program controlled manner by means of gripping member 15 out of the opened injection mold 3 and can be transported out of the working area of the injection molding machine 1. In order to effect the removal, guide bed 8 of the apparatus 7 projects over at least the front end face of the injection molding machine 1 or its closing unit 2. Guide bed 8 can preferably also extend over the rear face of the injection molding machine 1. Thus, it is possible to move the individual injection molded articles 6 by means of main carriage 10 out of the area of the injection molding machine 1 toward the front or toward the rear and to deposit the articles 6 on a conveying device 16 or on a stacking table. It is advantageous if the support member 14 is mounted on carriage 13 of the 2-way support acting as carrier or cantilever so as to be adjustable in its effective length, so that it can be adjusted in an optimum manner to different working conditions without impairing the range of movement of the carriage 13 in the direction of the Y-axis The above-described arrangement of the arrangement 7 for removing injection molded articles relative to the injection molding machine 1 cannot only be used where the support member 14 is held and guided by a two-way support. The apparatus can also be used when the support member is a straight-line guide linkage 17 formed as cardan or elliptic guide arms or also as a pantograph, wherein the sliding guide 18 of the linkage is mounted on a carriage 17 which is moveable along guide bed 8. The sliding guide 18 for the straight-line guide linkage extends on carriage 19 parallel to guide bed 8 and essentially transversely of the direction of movement of the free end of the support member 14 on which the gripping member 15 is located.

FIG. 4 shows that constructing the support member 14 as a straight-line guide linkage results in a further structural simplification of the apparatus 7 for removing injection molded articles because a two-way support composed of main carriage 10 with vertical member 11 and additional carriage 13 is not required. Since only carriage 19 forming the carrier or cantilever supporting support member 14 is required, the apparatus 7 illustrated in FIG. 4 has a substantially smaller structural height as compared to the apparatus illustrated in FIGS. 1 to 3, so that the apparatus can also be used when the injection molding machine 1 is in buildings having relatively low ceilings.

We claim

1. Injection molding machine with an apparatus for the linear removal of injection molded articles from the opened injection mold, the injection molding machine having two injection mold halves and a frame or housing and a closing unit wherein a two-way support or carriage with a support member carried by the two-way support or carriage is movably mounted on a guide bed aligned above the closing unit for the injection mold, wherein the support member carries at its lower end a gripping member for the injection molded articles with gripping member is adjustable in an upward direction, wherein the gripping member in turn is adjustable relative to the support member about at least two joints extending at a right angle relative to each other, wherein the longitudinal axis of the guide bed for the two-way support or carriage is aligned parallel to the actuating device of the closing unit or to the longitudinal axis of the injection mold, characterized in that the two-way support (10 to 13) or carriage (19) supports or forms a carrier or cantilever (13) on whose free end is mounted the support member (14) so as to be vertically movable exclusively along a vertical plane extending through the longitudinal axis (5—5) of the closing unit (2), that the guide bed (8) is rigidly fastened independently of the mold halves via support arms (9) directly to or on the frame or housing of the injection molding machine (1), and that the guide bed (8) projects at least with its one end over the front end face of the injection molding machine or over its closing unit (2) for the injection mold (3) wherein the movement of the two-way support or carriage on the guide bed, the movement of the support member relative to the two-way support or carriage and the adjustment of the gripping member about the at least two joints are independent of the opening and closing movement of the injection mold, so that the apparatus for the removal of injection molded articles is operated independently of the closing unit.

2. Injection molding machine according to claim 1, characterized in that the guide bed (8) also projects over the rear face of the injection molding machine (1).

3. Injection molding machine according to claims 1 or 2, characterized in that the carrier or cantilever (13) is held on a vertical guide track (12) of the main carriage (10, 11) so as to be moveable exclusively in an upward and downward direction.

4. Injection molding machine according to one of claim 3, characterized in that the effective length of the support member (14) is adjustable relative to the carrier or cantilever (13).

5. Injection molding machine according to claims 1 or 2, characterized in that the support member (14) includes a cardan or elliptic guide arm linkage (17) whose sliding guide (18) on carriage (19) is aligned parallel to the guide bed (8) and transversely to the direction of movement of its end carrying the gripping member (15).

* * * * *